E. B. GRACE.
WHEEL SECURING DEVICE.
APPLICATION FILED FEB. 18, 1921.
1,422,697
Patented July 11, 1922.
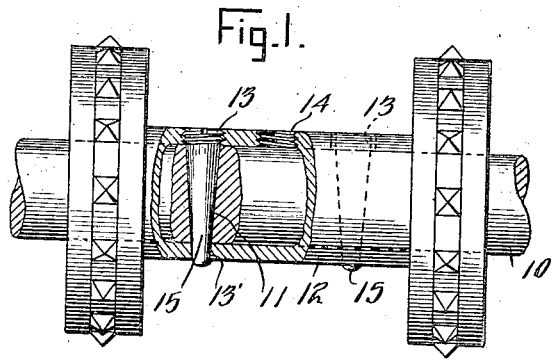
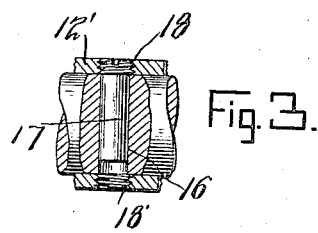
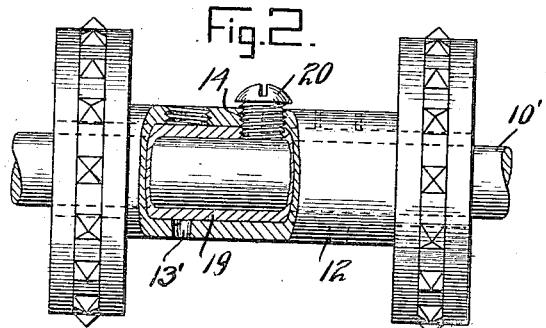
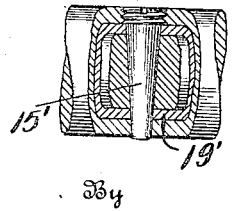
Inventor
Edwin B. Grace.
By
Attorney

UNITED STATES PATENT OFFICE.

EDWIN B. GRACE, OF MEMPHIS, TENNESSEE, ASSIGNOR OF ONE-HALF TO GORDON ERSKINE, OF MEMPHIS, TENNESSEE.

WHEEL-SECURING DEVICE.

1,422,697. Specification of Letters Patent. Patented July 11, 1922.

Original application filed April 24, 1918, Serial No. 230,436. Divided and this application filed February 18, 1921. Serial No. 446,132.

*To all whom it may concern:*

Be it known that I, EDWIN B. GRACE, a citizen of the United States, residing at Memphis, in the county of Shelby and State of Tennessee, have invented certain new and useful Improvements in Wheel-Securing Devices, of which the following is a specification.

My said invention relates to a device for securing sprocket wheels to their shafts and more particularly sprockets of the type used in moving picture machines, both cameras and projectors, and is a division of my application No. 230,436, April 24, 1918.

It is an object of my invention to provide a sprocket wheel preferably of the duplex type with means securely fastening the same to a shaft on which it is mounted, without danger of mutilation of the sprocket hub or springing of the shaft such as frequently results from the hammering required to position the securing pin commonly used.

A further object is to provide securing means which may be inserted or removed in a ready and convenient manner.

Another object is to provide means whereby a sprocket wheel may be locked to any one of a plurality of shafts varying in thickness such as shafts of the intermittent movement, the top feed, and the take up feed of the ordinary projecting or camera motion picture machine.

Referring to the accompanying drawings which are made a part hereof and on which similar reference characters indicate similar parts, Figure 1 is a view of a sprocket wheel on a shaft partly in elevation and partly in section, Figure 2, a modified form showing the application of the same duplex sprocket wheel to a smaller shaft, Figure 3, a modification showing a different key, and Figure 4, another modification.

In the drawings 10 indicates a shaft having tapering holes 11 extending transversely thereof. Mounted on the shaft is a hub 12 of a duplex sprocket wheel, the said hub having threaded openings 13, 13 and 14, of which 14 is the usual central opening in which a set screw engages to fasten the sprocket wheel to its shaft and 13, 13 are openings used in connection with my tapering key 15, two keys being used for greater security. These keys may extend entirely through the shaft and may engage openings 13′ opposite the screw threaded openings engaged by the head portion of the keys.

In Figure 2 where the sprocket wheel is to be used with a smaller shaft such as the shaft of the feed or take-up of the machine there is shown a sleeve 19 interposed between the shaft and the hub 12. This sleeve has a screw threaded opening which may register with the opening 14 and a set screw 20 is provided which engages in the registering openings and bears against the shaft.

In place of the tapering key and key-way I may provide a cylindrical key-way 16 extending through the shaft as shown in Figure 3 and a cylindrical key 17 to lock the hub to the shaft. Threaded openings 18 may be provided at each side of the hub so that the key can be inserted from either side.

In Figure 4 is shown another modification, the sleeve 19′ being used with a tapered key 15′ the tapering key-way being formed to extend through the shaft and the sleeves.

It is proposed to construct the hub of aluminum and the key or set screw of steel, but other materials may be used if desired.

The provision of a key such as 11 which is a sort of combination pin and set screw permits the entire intermittent movement of the machine to be removed without disturbing the original position of the eccentric bushings and avoids danger of springing the intermittent shaft. This is a task which has heretofore been deemed exceptionally difficult and has required very highly skilled labor. With my devices the same operation can be performed by any unskilled workman, with resultant economy in time and money.

It will be evident that various modifications may be made without departing from my invention. For example in certain moving picture machines a single key such as 11 is sufficient to retain the sprocket in place and such a key will then be inserted in the opening 14, the shaft being correspondingly bored. Also I may use a pin such as 17 in place of the pin 15 in Figure 4, if desired. I may also extend pin 17 in Figure 3 far enough to pass through hole 18′, and this hole may be left without screw threads, if desired. All such obvious modifications as well as others falling within the scope of my invention, I claim as a part thereof the true scope of the invention being indicated by the appended claims.

Having thus fully described my said invention, what I claim as new and desire to secure by Letters Patent, is:

1. A hub having a sprocket at each end and means for attaching the same to a shaft comprising pairs of diametrically opposed openings in the hub one opening of each pair having screw-threads, substantially as set forth.

2. In combination, a wheel having a hub and means for securing it to shafts of varying size comprising a sleeve adapted to be inserted between the hub and a shaft and having a threaded member tapering toward its lower extremity and engaging in said holes and fitting snugly in a tapered hole in the shaft, substantially as set forth.

3. In combination, a wheel having a hub and means for securing it to shafts of varying size comprising a sleeve adapted to be interposed between the hub and a shaft, said hub and sleeve each having two diametrically opposed openings, one of the openings in the hub being screw threaded, said shaft having an opening registering with the openings in the hub and sleeve, substantially as set forth.

4. In combination, a wheel having a hub and means for securing it to shafts of varying size comprising a sleeve having a tapered opening adapted to register with a threaded opening in the hub, a tapered opening through the shaft, a tapering key having threads engaging said threaded opening and fitting in the tapered openings of the sleeve and shaft, said sleeve and hub also having other tapered openings engaged by the smaller end of the key, substantially as set forth.

5. The combination with a shaft having a tapering keyway and a sprocket wheel mounted on said shaft, of a tapering key fitting said key-way and having screw-threads securing said sprocket to the shaft, substantially as set forth.

6. The combination with a shaft having transverse and tapering key-ways, and a duplex sprocket wheel having a sleeve hub fitting on said shaft, of tapering pins fitting said key-ways and having screw-threads engaging the sprocket hub portion and securing said sprocket to the shaft, substantially as set forth.

7. A hub having a sprocket at each end and means for attaching the same to a shaft comprising pairs of diametrically opposed openings in the hub one opening of each pair being larger than the other and one opening of each pair being provided with means for securing a tapering key extending transversely of the hub, substantially as set forth.

8. The combination with a shaft, and a sprocket wheel having a sleeve hub loosely fitting said shaft, of a sleeve interposed between the sprocket sleeve hub and the shaft, and a screw having threaded engagement with the sprocket sleeve hub and a tapering engagement with said interposed sleeve and locking the same together and to said shaft, substantially as set forth.

9. A hub having a sprocket at each end and means for attaching the same to a shaft comprising diametrically opposed pairs of openings for receiving keys extending transversely of the hub and its supporting shaft, a threaded opening intermediate said pairs of openings, and a sleeve adapted to fit within the hub and having a hole adapted to register with said intermediate opening, substantially as set forth.

In witness whereof, I have hereunto set my hand and seal at Memphis, Tennessee, this 17th day of January, A. D. nineteen hundred and twenty-one.

EDWIN B. GRACE. [L. S.]

Witnesses:
W. G. ERSKINE,
M. H. ROBINSON.